Sept 17, 1957  L. W. FAGG ET AL  2,806,721
STUFFING BOX ASSEMBLY
Filed Oct. 12, 1953  2 Sheets-Sheet 1
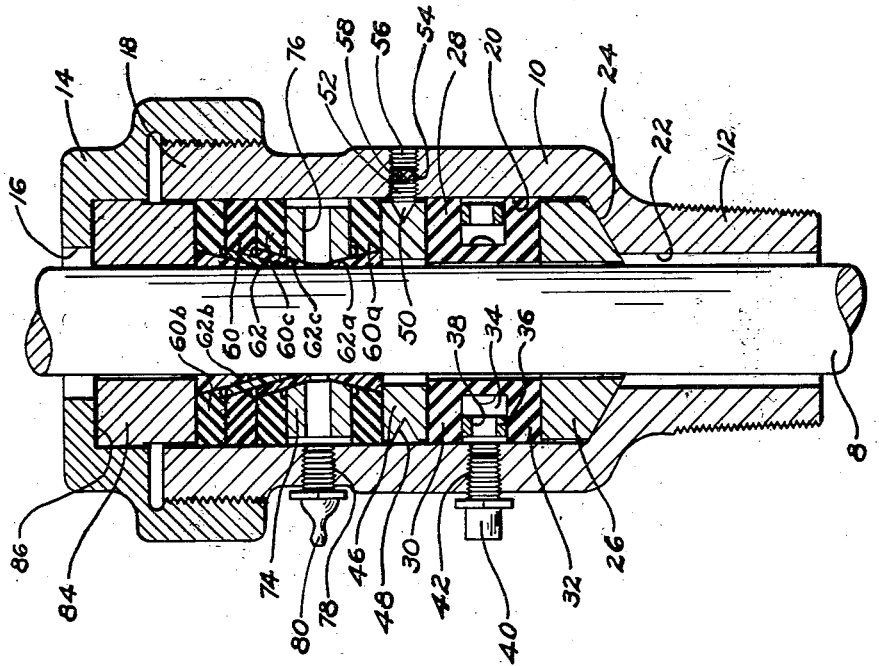
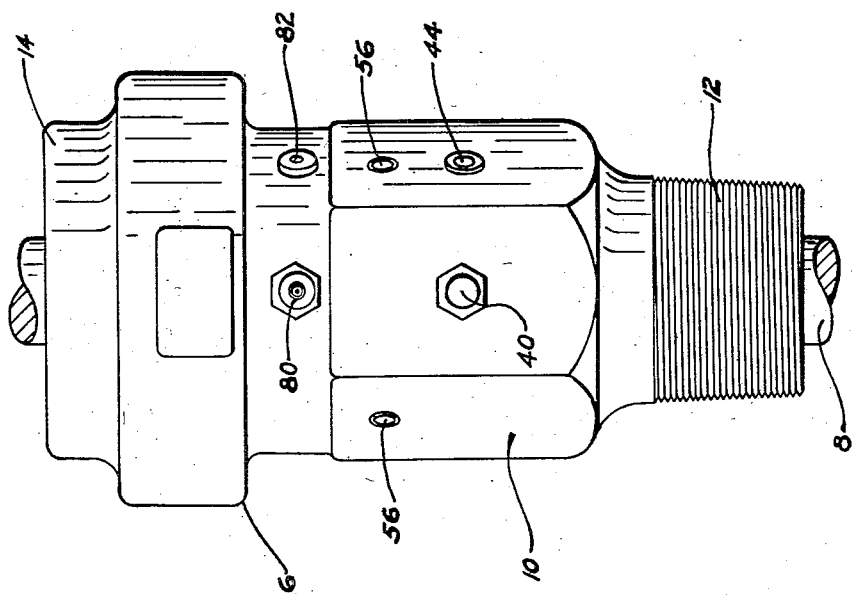
INVENTOR.
LEO W. FAGG, AND
CHESTER L. SHARP
BY
ATTORNEY

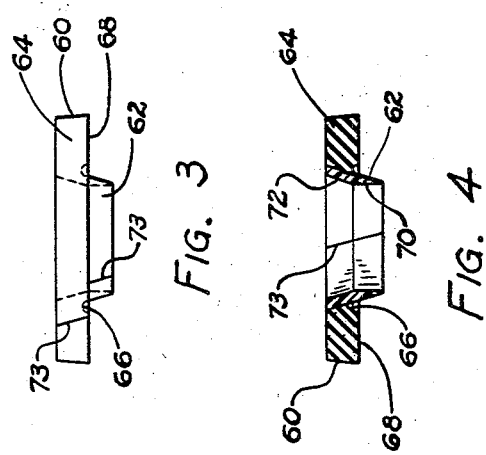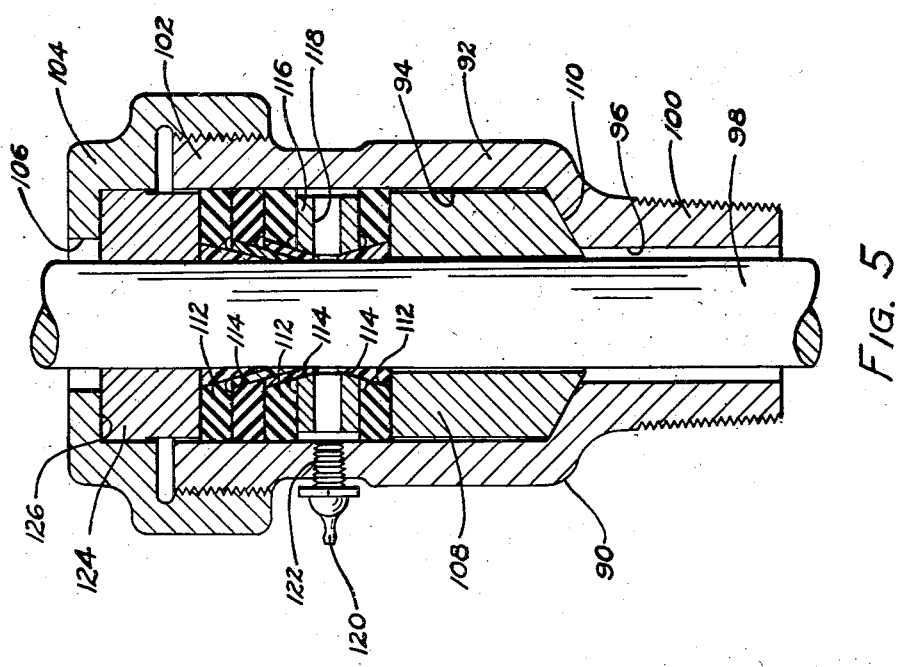

United States Patent Office 2,806,721
Patented Sept. 17, 1957

2,806,721

STUFFING BOX ASSEMBLY

Leo W. Fagg and Chester L. Sharp, Tulsa, Okla., assignors to Johnson-Fagg Engineering Company, Tulsa, Okla., a partnership comprised of Douglas O. Johnson and Leo W. Fagg Application October 12, 1953, Serial No. 385,582

1 Claim. (Cl. 286—27)

This invention relates to improvements in stuffing box assemblies and more particularly, but not by way of limitation, to stuffing box assemblies adapted for use on producing oil wells.

As it is well known in the art, oil wells being produced by rod type pumps are provided with a stuffing box at the well head around the polish rod, which is the uppermost actuating rod. These stuffing boxes incur unusually hard wear due to the eccentric action of the polish rod. That is, the polish rod is ordinarily not moved in a true vertical reciprocation during the pumping operation. Also, many oil wells develop excessive pressures and these pressures are exerted directly on the lower end of the stuffing box. Thus, when the stuffing boxes are partially disassembled to replace the packing rings, the oil well pressure escapes through the stuffing box, making a dangerous condition for the operator. The stuffing boxes are also frequently subject to improper maintenance by the various operators, and particularly in the tightening of the stuffing boxes. Many times the stuffing boxes are over tightened with resulting damage to the packing rings contained therein.

The present invention contemplates a novel stuffing box assembly for use on the well head of an oil well produced by a rod-type pump. Spaced bearing members are provided in the stuffing box to maintain the polish rod in alignment during reciprocation thereof. Novel packing rings, having substantially flat end faces, are provided in the assembly and are so constructed to receive excessive pressures caused either by the oil well pressure or by inadvertent tightening of the stuffing box. Each of the packing rings are provided with a long wear-resistant inner core to provide the maximum service life for the stuffing box assembly. In one modification of the stuffing box assembly, a novel pack-off ring is provided in the lower portion of the stuffing box housing to seal off the well head pressure during changing of the packing rings. The pack-off ring is actuated by fluid pressure and the fluid pressure may be readily relieved upon resuming the normal operation of the stuffing box assembly.

An important object of this invention is to provide a long wearing stuffing box assembly requiring the minimum of maintenance.

Another object of this invention is to provide a stuffing box assembly which will run without lubrication for an extended period of time.

Another object of this invention is to provide a stuffing box assembly wherein operation of the packing rings will not be materially reduced in efficiency by an inadvertent excessive tightening of the stuffing box.

A further object of this invention is to provide a stuffing box assembly having means for simply and efficiently retaining the well head pressure during changing of the packing rings, and will provide an increased pack-off action upon an increase in well head pressure.

Another object of this invention is to retain the polish rod of an oil well rod type pump in alignment with the packing rings of a stuffing box assembly.

A still further object of this invention is to provide a stuffing box assembly which may be simply and efficiently lubricated.

Other objects and advantages of the invention will be evident from the following detailed description, read in conjunction with the accompanying drawings, which illustrate my invention.

In the drawings:

Figure 1 is an elevational view of a novel stuffing box installed on the polish rod of an oil well rod-type pump.

Figure 2 is a vertical sectional view of the stuffing box shown in Fig. 1.

Figure 3 is an elevational view of the preferred packing ring utilized in the stuffing box shown in Figs. 1 and 2.

Figure 4 is a vertical sectional view of the packing ring shown in Fig. 3.

Figure 5 is a vertical sectional view of a modified stuffing box assembly.

Referring to the drawings in detail, and particularly Figs. 1 and 2, reference character 6 generally indicates a stuffing box assembly for use on a polish rod 8. The stuffing box assembly 6 comprises a substantially tubular housing 10 with the lower end portion 12 thereof reduced in diameter and threaded to facilitate connection of the housing 10 to a well head (not shown). The housing 10 is normally secured in a vertical position as illustrated in Figs. 1 and 2 concentrically around the polish rod 8. A suitable cap 14, having an aperture 16 in the central portion thereof to loosely receive the polish rod 8, is threadedly secured to the upper end 18 of the housing 10.

The inner diameter of the housing 10 is varied to provide a large chamber 20 communicating with the upper end 18 and a smaller chamber 22 communicating with the lower end 12. The inner wall 24 of the housing 10 between the chambers 20 and 22 is tapered downwardly and inwardly to provide a seat for a lower bearing member 26. The bearing member 26 is tubular in configuration with an outer diameter substantially equal to the diameter of the chamber 20 and an inner diameter of a size to provide a sliding fit of the bearing member 26 on the polish rod 8.

A novel pack-off ring 28 is disposed in the chamber 20 immediately above the lower bearing member 26 and normally rests upon the bearing member 26. The pack-off ring 28 is substantially C-shaped in cross section to provide upper and lower outwardly extending flanges 30 and 32 respectively. The flanges 30 and 32 normally extend outwardly into contact with the walls of the chamber 20 and provide a closed annular chamber 34 therebetween. The inner periphery of the pack-off ring 28 is preferably provided with a tubular fabric insert (not shown), such as nylon, bonded to the remainder of the ring 28.

A ring 36, having a plurality of circumferentially spaced transverse apertures 38 therein, is disposed in the chamber 34 between the pack-off flanges 30 and 32. The ring 38 is formed out of a hard material, such as wood or metal, and is of a width to contact the adjacent faces of the flanges 30 and 32 when the flanges 30 and 32 extend horizontally as shown in Fig. 2. Thus the ring 36 will at all times retain the flanges 30 and 32 in spaced relation as shown. A plurality of grease fittings 40, of any suitable type, are threaded into apertures 42 provided in the wall of the housing 10 in communication with the chamber 34. In addition, one or more check valves 44 are secured in the housing 10 in similar apertures (not shown) in communication with the chamber 34. The check valves 44 are of well known construction to retain pressure in the chamber 34, but which may be actuated to release the pressure from the chamber 34.

The pack-off ring 28 is maintained in the desired vertical position by a retaining ring 46. The retaining ring 46 is preferably of metal construction and the inner diameter thereof is of a size to loosely receive the polish rod 8. The outer diameter of the retaining ring 46 is substantially equal to the diameter of the chamber 20, and the outer periphery thereof is provided with a V-shaped circumferential groove 48. The groove 48 is provided to receive the inner tapered ends 50 of a plurality of set screws 52 extending inwardly into the chamber 20. Transverse threaded apertures 54 are provided in the housing 10 opposite the retaining ring 46 to receive the set screws 52. These set screws 52 may be of any desired length but are preferably shorter than the thickness of the wall of the housing 10 as shown in Fig. 2. In this event, a second set screw 56 may be inserted in each of the apertures 54 outwardly of the set screws 52 with a gasket or the like 58 therebetween. The set screws 52 will then not be inadvertently removed or damaged by objects striking the outer surface of the housing 10.

A plurality of packing rings 60 are disposed in the chamber 20 above the retaining ring 46. Each packing ring 60 is provided with a projecting annular lip 62 for contacting the polish rod 8 and is preferably constructed as shown in detail in Figs. 3 and 4. The preferred packing ring 60 has an annular shaped resilient main body portion 64 with the outer periphery thereof tapered slightly inward in a direction away from the projecting lip 62. The opposite end faces of the body portion 64 are substantially flat with an annular groove 66 in the end face 68 immediately outward of the projecting lip 62. The lip 62 and the inner core of the packing ring 60 are formed out of a laminated fabric 70, such as nylon, impregnated with a vulcanizing gum, such as an oil resistant "hycar" rubber base material. The main body portion 64 may be formed out of a similar vulcanizing gum to permit bonding of the laminated fabric 70 thereto. The outer periphery of the lip 62 is tapered inwardly away from the end face 68, and the opposite portion 72 of the laminated fabric 70 is bent in the opposite direction at an equal angle. In addition, the bent portion 72 is of slightly greater length than the lip 62. Thus, when the packing rings 60 are super-imposed as shown in Fig. 2, the downwardly extending lip 62 of one packing ring 60 will extend into the bent portion 72 of the next lower packing ring 60. Also, each packing ring 60 is cut on the bias at 73 to facilitate installation thereof.

In the assembly shown in Fig. 2, three of the packing rings 60 are stacked with the lips 62 thereof extending downwardly around the polish rod 8. Another packing ring 60ᵃ is turned in the opposite direction and rests upon the retaining ring 46. It will be noted that the upper and lower packing rings 60ᵇ and 60ᵃ are modified in that the inner diameters thereof are uniform, since there is no lip 62 to extend into these two rings. This construction is preferred to obtain the maximum seal around the rod 8. A lubricating ring 74 having a plurality of transverse apertures 76 therein is disposed in the chamber 20 between the inverted packing ring 60ᵃ and the lowermost upright packing ring 60ᶜ. The inner diameter of the lubricating ring 74 is substantially equal to the outer diameter of the lips 62ᵃ and 62ᶜ contacted thereby, and the length of the ring 74 is such to prevent contact of the opposed lips 62ᵃ and 62ᶜ.

A plurality of transverse threaded apertures 78 are provided in the wall of the housing 10 directly opposite the lubricating ring 74 to receive lubricating fittings 80. In addition, a pressure relief valve 82 is secured in the wall of the housing 10 opposite the lubricating ring 74 and in communication with the chamber 20 to bleed off excessive fluid pressures which may be inadvertently imposed in this portion of the chamber 20.

An upper tubular shaped bearing member 84 is disposed in the chamber 20 above the uppermost packing ring 60ᵇ. The opposite ends of the upper bearing member 84 are substantially flat and the bearing member 84 is of a length to extend upwardly above the upper end 18 of the housing 10 into a circular recess 86 of the cap 14. Thus, when the cap 14 is tightened, pressure is exerted on the packing rings 60 through the medium of the upper bearing member 84. The inner diameter of the bearing member 84 is of a size to provide a sliding fit with the polish rod 8. Any suitable bearing material may be utilized in forming the upper and lower bearing members 84 and 26. However, it has been found that lignum vitae wood is the preferred material for stuffing box assemblies utilized on oil wells. The lignum vitae wood has a high oil content and is not easily scratched or scored.

Operation

When the stuffing box assembly 6 is installed on the well head around the polish rod 8, the cap 14 is tightened onto the housing 10 to slightly compress the resilient body portions 64 of the packing rings 60 to retain the packing ring lips 62 into close contact with the polish rod 8. During reciprocation of the rod 8, the packing rings 60 will retain the well head pressure below the housing 10 and prevent escape of fluid around either the polish rod 8 or the walls of the chamber 20. During this normal operation of the polish rod 8, no pressure will be exerted in the chamber 34 of the pack-off ring 28. Therefore, the pack-off ring 28 will fit rather loosely on the polish rod 8 and the inner core thereof will not be unduly worn.

As the inner fabric core 70 of the packing rings 60 become worn, the cap 14 is further tightened onto the housing 10 to further compress the resilient body portions 64 of the packing rings 60 to maintain the seal around the polish rod 8. Periodically a suitable lubricant is inserted through the grease fittings 80 into the chamber 20 in the proximity of the lubricating ring 74. This lubricant works inwardly through the apertures 76 of the lubricating ring 74 and between the adjacent ends of the opposed packing ring lips 62ᵃ and 62ᶜ onto the surface of the polish rod 8. The lubricant thus applied reduces friction between the polish rod 8 and the packing rings 60 and enhances the seal around the polish rod 8. In the event excessive lubricant is inadvertently applied through the fittings 80, a portion thereof may be removed by manual operation of the check valves 82.

When the packing rings 60 become worn out, or when it is desired to disassemble the stuffing box assembly 6 for any other reason, the polish rod 8 is preferably stopped. A suitable grease or other lubricant is then forced through the lubrication fittings 40 into the chamber 34 of the pack-off ring 28. As the fluid pressure in the chamber 34 is built up, the pack-off ring 28 is expanded to grip the wall of the chamber 20 and the outer surface of the polish rod 8. The pack-off ring 28 will thus efficiently seal off the well head pressure from the upper portion of the chamber 20. Also, the retaining ring 46, being rigidly secured by the set screws 52, will prevent any upward movement of the pack-off ring 28. A novel feature of the pack-off ring 28 is that the well head pressure exerted thereon will merely increase the pressure of the lubricant in the chamber 34. Therefore, the higher the well head pressure, the tighter the pack-off ring will be sealed to the wall of the chamber 20 and rod 8.

The cap 14 may then be removed to replace the packing rings 60. Upon re-assembly of the stuffing box assembly 6 as shown in Fig. 2, the fluid pressure in the chamber 34 of the pack-off ring 28 is bled off by manual operation of the check valves 44. The pack-off ring 28 will then be released from the polish rod 8 to permit free reciprocation thereof. In the usual installation, the polish rod 8 may be reciprocated when the pack-off ring 28 is expanded, but excessive wear will occur on the inner diameter of the pack-off ring 28.

The modified stuffing box assembly generally indicated at 90 and illustrated in Fig. 5 is particularly adapted for use on wells having no appreciable well head pressure.

The stuffing box assembly 90 comprises a tubular shaped housing 92 having an upper large chamber 94 and a lower small chamber 96. The housing 92 encloses the usual polish rod 98 and the lower end 100 thereof is reduced in diameter and threaded for connection with a well head (not shown). The upper end 102 of the housing 92 is also threaded to receive a cap 104. An enlarged aperture 106 is provided in the central portion of the cap 104 to loosely receive the polish rod 98.

A lower tubular shaped bearing member 108 is disposed in the lower portion of the chamber 94 and rests on a tapered seat 110 provided in the lower end of the chamber 94. An inverted packing ring 112, preferably of the same structure as the packing ring 60 shown in Figs. 3 and 4, is disposed in the chamber 94 on top of the lower bearing member 108. The annular lip 114 of the inverted packing ring 112 extends upwardly around the polish rod 98. A lubricating ring 116 having a plurality of transverse apertures 118 therein is disposed around the upwardly projecting lip 114 and rests upon the main body portion of the inverted packing ring 112. The lubricating ring 116 receives lubricant from a grease fitting 120 threadedly secured in an aperture 122 provided transversely in the wall of the housing 92.

A plurality of similar packing rings 112 are stacked in an upright position in the chamber 94 above the lubricating ring 116. The lip 114 of the lowermost upright packing ring 112 extends downwardly into the lubricating ring 116 and the main body portion of the respective packing ring 112 rests upon the lubricating ring 116. The ring 116 is of sufficient length to retain the respective lips 114 in spaced relation as shown in Fig. 5. The lips 114 of the remaining upright packing rings 112 extend downwardly into the next adjacent packing ring 112.

An upper tubular shaped bearing member 124 is disposed on the upper packing ring 112 and extends upwardly beyond the upper end 102 of the housing 92 into a circular recess 126 of the cap 104. Thus, when the cap 104 is tightened onto the housing 92, the upper bearing member 124 exerts a downward force on the packing rings 112 to compress the same and provide an efficient seal with the polish rod 98 and the wall of the chamber 94. The bearing members 108 and 124 are preferably constructed out of lignum vitae wood, as in the stuffing box assembly 6.

The normal operation of the modified stuffing box assembly 90 is similar to the normal operation described above for the stuffing box assembly 6. The polish rod 98 reciprocates in a vertical direction with the packing rings 112 providing a seal around the polish rod 98 and the walls of the chamber 94 to prevent any upward flow of fluid through the housing 92. Lubricant is periodically inserted through the fittings 120 and lubricating ring 116 onto the surface of the polish rod 98.

As previously stated, the stuffing box assembly 90 may be used on wells having no appreciable well head pressure. Therefore, when the polish rod 98 is stopped, the cap 104 may be removed without providing a pack-off for the housing 92.

From the foregoing, it is apparent that the present invention provides a novel long-wearing stuffing box assembly requiring the minimum of maintenance. The preferred packing rings are of such construction to receive excessive pressures caused by inadvertent tightening of the stuffing box and to provide an efficient seal around a polish rod or the like when the stuffing box is tightened in such a manner. The inner core or wearing surface of the preferred packing rings is of such construction to provide a long service life for the stuffing box assembly and to permit operation of the stuffing box for an extended period of time without external lubrication. It is also apparent that the well head pressure may be simply and efficiently packed off during replacement of the packing rings by the use of a grease gun, which practically all operators retain in their possession. The polish rod reciprocating through a stuffing box constructed in accordance with the present invention will be retained in alignment with the packing rings to enhance the efficiency of the assembly.

Furthermore, it will be apparent that the stuffing box is capable of supporting the full load of a sucker rod string or impact loads imposed by conventional well spacing and well servicing practices. Such loads are usually the result of clamping off the polished rod below the hanger and allowing the polish rod to rest on the stuffing box in such a manner to support the weight of the sucker rod string.

Changes may be made in the combination and arrangement of parts as heretofore set forth in the specification and shown in the drawings, it being understood that any modification in the precise embodiment of the invention may be made within the scope of the following claim without departing from the spirit of the invention.

We claim:

In a stuffing box for use on the well head and reciprocable polish rod of an oil well, a tubular housing member loosely disposed around the polish rod, upper and lower bearing members provided within the housing around the polish rod and in axial alignment therewith for facilitating reciprocal movement of the polish rod, a plurality of packing ring members disposed in a stacked relationship between the bearing members and adjacent the upper bearing member, each of said packing ring members comprising a resilient annular body portion having substantially flat opposite end faces, an annular lip member extending from one of said faces of each packing ring member and disposed adjacent the polish rod, each of said packing ring members provided with a tapered inner periphery to receive the annular lip member of an adjacent packing ring member, at least one of said packing ring members disposed with the lip member thereof extending in an opposite direction from the lip members of the remaining packing ring members, a lubricating ring member interposed between the packing ring members so that the packing ring member having the oppositely disposed lip member is spaced from the first mentioned packing ring members and adjacent the lower surface of the lubricating ring member, a retainer ring member, means for securing the retainer ring member in the housing below the packing ring member having the oppositely disposed lip member to preclude a downward longitudinal movement of the packing ring members, and an apertured cap member threadedly secured to the housing above the upper bearing member for moving the said bearing member downwardly to compress the packing ring members for precluding leakage around the housing and polish rod.

References Cited in the file of this patent

UNITED STATES PATENTS

| | | |
|---|---|---|
| 528,773 | Ellis | Nov. 6, 1894 |
| 759,659 | Braungart | May 10, 1904 |
| 1,028,758 | Mason et al. | June 4, 1912 |
| 1,363,565 | Christenson | Dec. 28, 1920 |
| 1,873,267 | Bigelow et al. | Aug. 23, 1932 |
| 1,930,361 | Kilmer | Oct. 10, 1933 |
| 2,090,956 | Wheeler | Aug. 24, 1937 |
| 2,193,587 | Fortune et al. | Mar. 12, 1940 |
| 2,245,007 | Nixon | June 10, 1941 |
| 2,372,423 | Hornschuch | Mar. 27, 1945 |
| 2,639,198 | Kirkham | May 19, 1953 |
| 2,660,458 | Collins et al. | Nov. 24, 1953 |

FOREIGN PATENTS

| | | |
|---|---|---|
| 1,793 | Great Britain | 1892 |
| 639,102 | Germany | Nov. 28, 1936 |